March 23, 1926.
B. M. HERRERA
AMUSEMENT DEVICE
Filed August 7, 1925
1,577,578
3 Sheets-Sheet 1
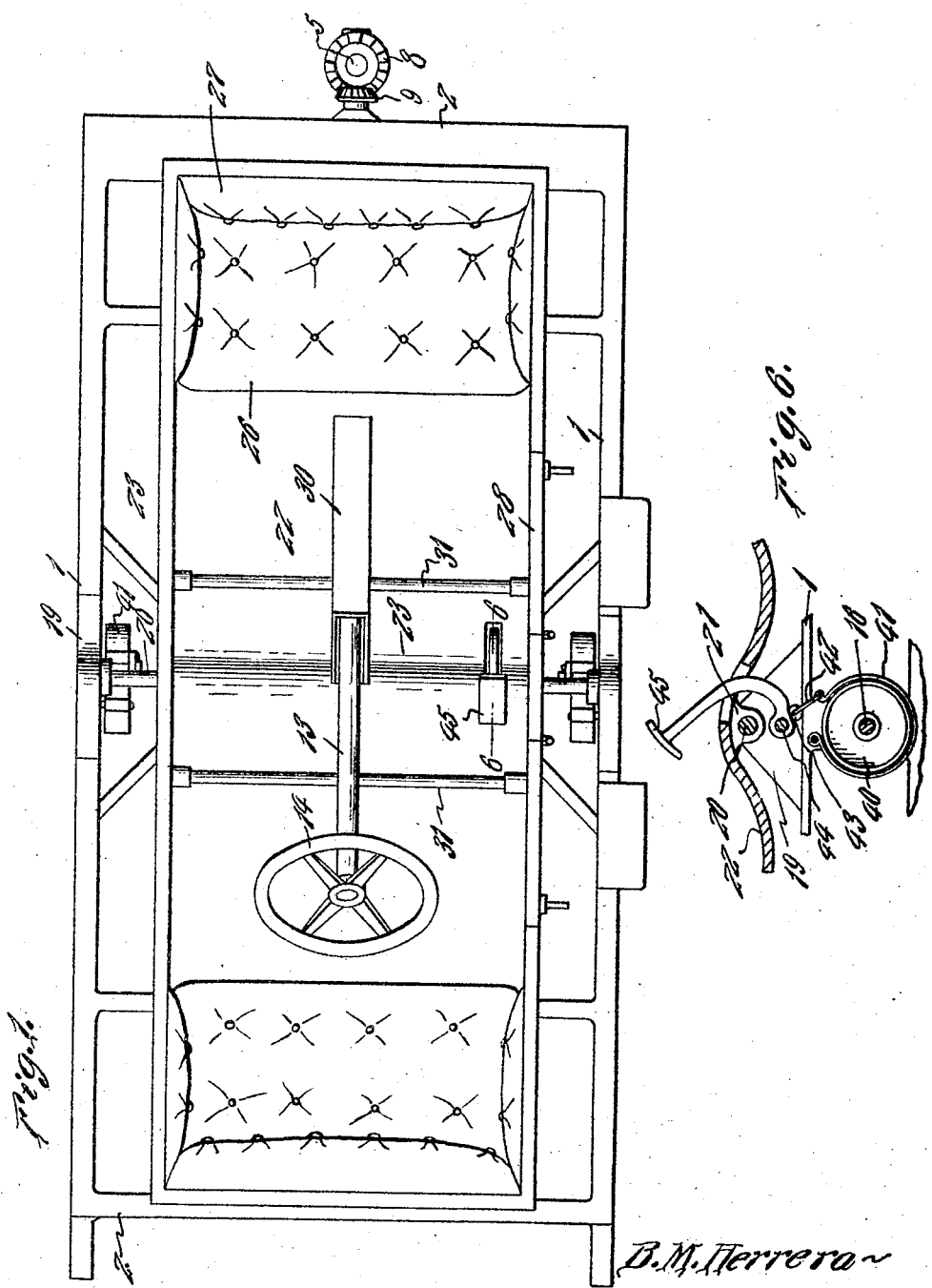
B. M. Herrera
INVENTOR
BY Victor J. Evans
ATTORNEY March 23, 1926. 1,577,578
B. M. HERRERA
AMUSEMENT DEVICE
Filed August 7, 1925   3 Sheets-Sheet 2
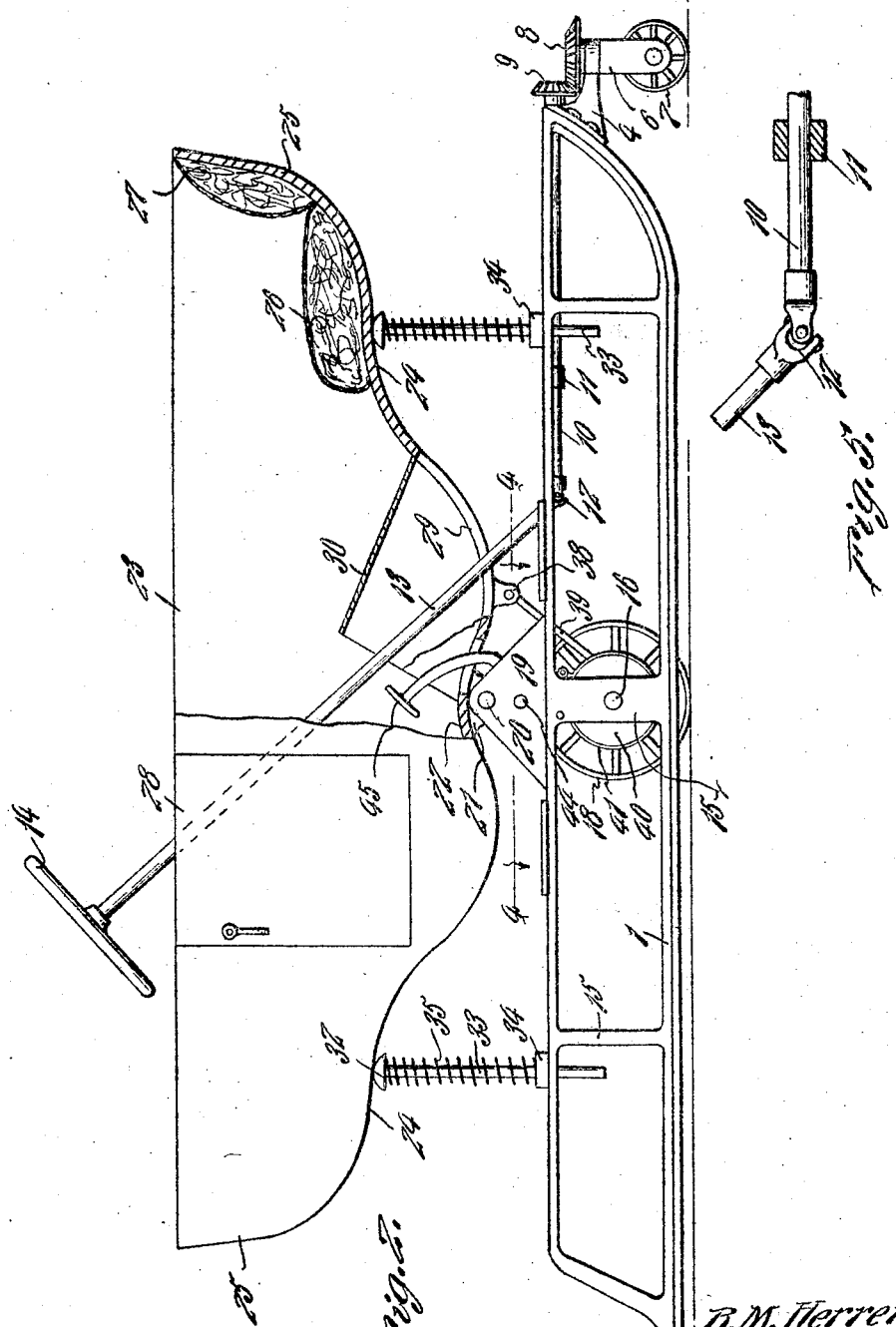

March 23, 1926.
B. M. HERRERA
AMUSEMENT DEVICE
Filed August 7, 1925 3 Sheets-Sheet 3
1,577,578
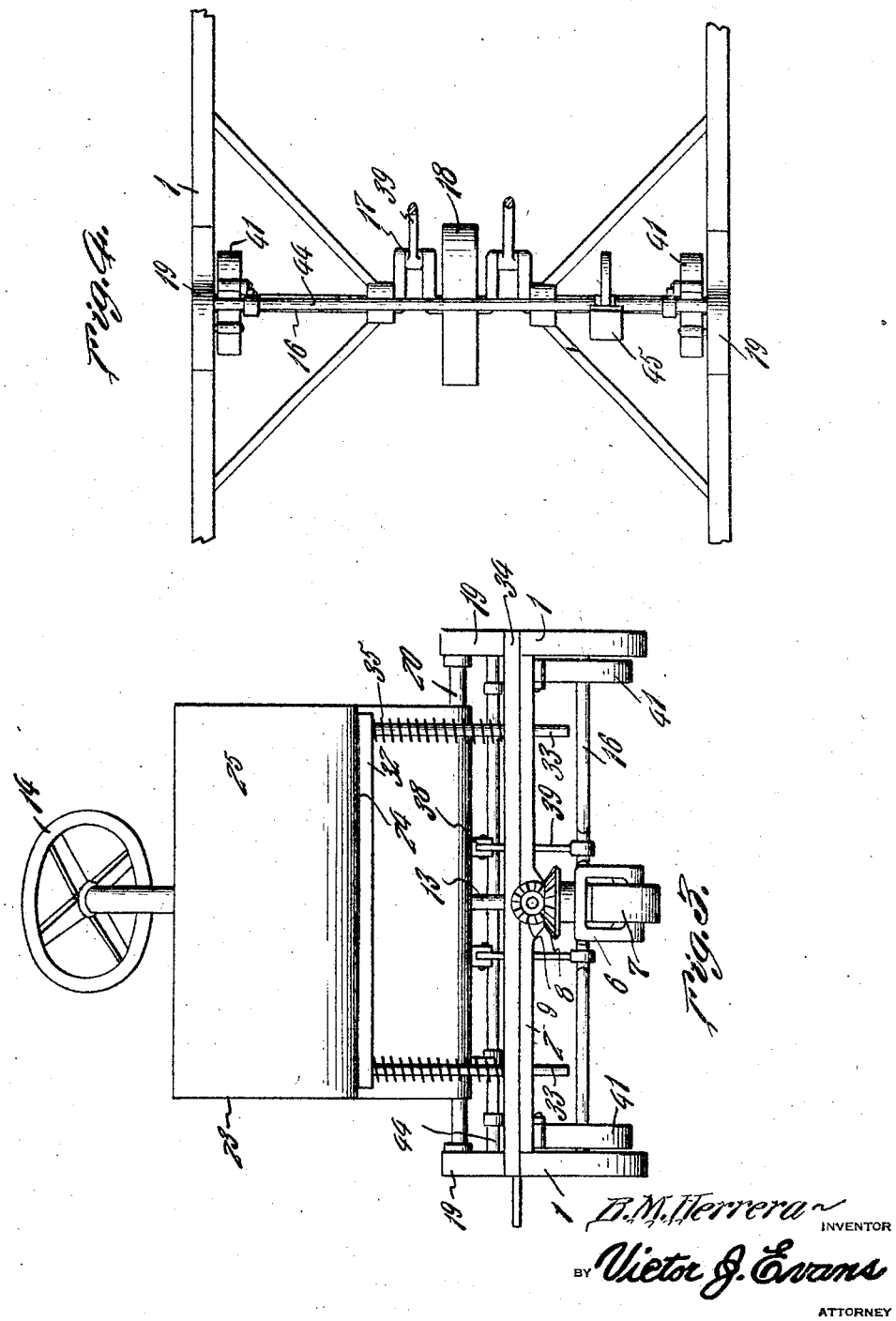

Patented Mar. 23, 1926.

1,577,578

UNITED STATES PATENT OFFICE.

BALDOMERO M. HERRERA, OF ALFONSO, CAVITE, PHILIPPINE ISLANDS.

AMUSEMENT DEVICE.

Application filed August 7, 1925. Serial No. 48,826.

*To all whom it may concern:*

Be it known that I, BALDOMERO M. HERRERA, a citizen of the United States, residing at Alfonso, Cavite, Philippine Islands, have invented new and useful Improvements in Amusement Devices, of which the following is a specification.

My present invention has reference to an amusement device primarily but not necessarily restricted for use in amusement halls or booths, and my object is the provision of a device of this character comprising a body having drive wheels and a guide wheel and wherein the occupants of the body are designed to impart an up and down movement with reciprocating motion thereto and by virtue of such motion to actuate mechanism for revolving the drive wheels, and wherein both amusement and healthy exercise is provided for the occupants of the body.

A further object is the provision of a wheel propelled amusement device that is at all times under the control of the occupant and which is of a comparatively simple nature so that the same may be cheaply manufactured and marketed.

To the attainment of the above recited objects and others which will appear as the nature of the invention is better understood, reference is to be had to the drawings which accompany and form part of this application.

In the drawings:—

Figure 1 is a top plan view of the improvement.

Figure 2 is a side elevation thereof with parts in section.

Figure 3 is a front elevation thereof.

Figure 4 is a sectional view on the line 4—4 of Figure 2.

Figure 5 is an elevation to illustrate the universal joint connection between the steering post sections.

Figure 6 is a section on the line 6—6 of Figure 1.

As disclosed by the drawings, I make use of a skid, the runners of which are indicated by the numerals 1. These runners are connected together, at suitable intervals, by cross bars 2. The front cross bar 2 has centrally secured thereto an outstanding bracket 4. Through this bracket there is journaled the shaft 5 on the mount 6 of the steering wheel 7. The shaft 5 has secured on its outer end a gear 8 which is in mesh with a smaller gear 9. The gear 9 is secured to one end of a steering rod 10. The steering rod 10 is journaled in suitable bearings 11. Secured to the rod 10 by a universal connection 12 there is the upwardly directed angularly disposed steering post 13. The post 13 has on its outer end a steering wheel 14.

Between the shoe and top portion of the runners 1 there are suitable vertical braces 15. Journaled in bearing openings in the central braces 15 there are the straight ends of a crank shaft 16. The shaft has two cranked portions 17, and fixed between the said cranks there is a drive wheel 18.

The top members of the runners 1 are centrally formed with upstanding brackets 19 through which is journaled a shaft 20. The shaft is fixedly secured in brackets 21 formed on the central and inwardly concaved bottom portion 22 of the body 23 of the improvement. The body is substantially rectangular in plan and from its said central portion 22, has its base rounded downwardly and from thence upwardly and outwardly to provide the bottom portions 24 and the ends 25 of the said body. The ends of the body are cushioned, as at 26, to provide seats for the occupants of the body 23, while other cushions 27 provide sides and backs for the seats. One of the straight sides of the body 23 is provided with openings which are normally closed by hinged doors 28, and the steering post 13 passes through an elongated slot 29 in the bottom of the body 23. The post is also preferably directed through a hollow division member 30 in the body. The occupant of the seat, adjacent to the division member 30, has his legs straddling the said member so that the reciprocatory movement of the post 13 will not inflict injury to the said occupant. The body 23 at the opposite sides of the central portion 22 of its bottom has transverse rails 31 which afford foot rests for the occupants.

The portions 24 of the bottom of the body 23 rest on the rounded outer faces of plates 32. Secured to and depending from the plates, adjacent to the ends thereof, are rods 33. The rods 33 pass through suitable guide openings in bosses 34 provided on two of the cross bars 2. Surrounding each rod and exerting tension between the plates 32 and the bosses 34 there are comparatively heavy helical springs 35.

Depending from the body, at a point beyond the center thereof, there are bearing lugs 38 for pitmen 39 and these pitmen are connected to the crank portions of the shaft 16.

Fixed on the shaft 16 there are brake wheels 40. Arranged around each brake wheel there is a brake band 41. Each band has one end pivoted to a suitable support on the runner frame and its opposite end connected by a link 42 to an eye 43. The eyes 43 are fixedly secured on a shaft 44 whose ends are journaled in the brackets 19. Also fixed on the shaft 44 is the arm of a pedal 45. The pedal passes through a suitable slot in the portion 22 of the body 23. The pedal is conveniently positioned with respect to one of the occupants of the body and a pressure of the foot thereon will instantly apply the brakes and halt the movement of the car or body.

One of the operators grasps the wheel 14 of the steering post. Both of the operators swing their bodies to cause the body or car 23 to move up and down with a swinging motion. This motion imparted to the body 23 will cause the pitmen 39 to turn the shaft 16 and thereby revolve the drive wheel 18. The runners permit of a limited side swinging of the car or body, but will prevent the said body being tilted over. The body is readily guided by the occupant holding the wheel 14 and the runners are sustained from ground contact when the occupants properly balance the car of the body. The brakes, as stated, may be instantly applied so that the device may be quickly stopped to avoid accidents. The improvement is of a simple construction and will not only afford amusement to the occupants of the car or body but provides healthy exercise. The improvement is, of course, susceptible to such changes or modifications as fairly fall within the scope of the appended claims.

Having described the invention, I claim:—

1. An amusement device including a skid provided with side runners, a guide wheel at the front of the skid and arranged below the runners thereof, a drive wheel having its shaft centrally journaled between the runners and skid and projecting below said runners, a body having its base centrally pivoted to the skid above the drive wheel, spring means for normally sustaining the body in horizontal position, said body designed, by the occupants thereof, to be imparted an up and down movement with a reciprocating motion and means between the body and the shaft of the drive wheel for turning the shaft when motion is imparted to the body.

2. An amusement device including a skid having side runners, a crank shaft centrally journaled between the runners, a drive wheel fixed on the crank shaft and having a portion of its periphery disposed below the runners, a guide wheel pivotally mounted at the front of the skid and having a portion of its periphery extending below the runners, upstanding brackets on the runners directly above the drive shaft, a body centrally pivoted to said brackets and spring influenced plates contacting the under face of the body at the opposite sides of its pivot normally influencing the body from swinging on its pivot.

3. An amusement device including a skid provided with side runners, a guide wheel at the front of the skid and arranged below the runners thereof, a drive wheel having its shaft centrally journaled between the runners and skid and projecting below said runners, a body having its base centrally pivoted to the skid above the drive wheel, spring means for normally sustaining the body in horizontal position, said body designed, by the occupants thereof, to be imparted an up and down movement with a reciprocating motion and means between the body and the shaft of the drive wheel for turning the shaft when motion is imparted to the body.

In testimony whereof I affix my signature.

BALDOMERO M. HERRERA.